United States Patent
Tabata et al.

(10) Patent No.: US 7,864,656 B2
(45) Date of Patent: Jan. 4, 2011

(54) OPTICAL STORAGE MEDIUM AND METHOD OF PRODUCING OPTICAL STORAGE MEDIUM

(75) Inventors: Hiroshi Tabata, Yokohama (JP); Ukou Sumoto, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 461 days.

(21) Appl. No.: 12/151,092

(22) Filed: May 2, 2008

(65) Prior Publication Data
US 2008/0279080 A1   Nov. 13, 2008

(30) Foreign Application Priority Data

| May 9, 2007 | (JP) | ............................ 2007-124430 |
| Dec. 3, 2007 | (JP) | ............................ 2007-312208 |

(51) Int. Cl.
*G11B 3/70* (2006.01)
*G11B 3/74* (2006.01)

(52) U.S. Cl. .................. 369/283; 369/288; 369/94; 428/64.6

(58) Field of Classification Search .......... 369/283, 369/94, 288, 280, 275.3, 275.4, 275.5; 428/64.6, 428/64.4, 64.1
See application file for complete search history.

(56) References Cited

U.S. PATENT DOCUMENTS

| 5,512,364 | A | * | 4/1996 | Chiba et al. | .................. 428/332 |
| 6,071,588 | A | * | 6/2000 | Nobumasa et al. | ......... 428/64.4 |
| 7,033,659 | B2 | * | 4/2006 | Shirai et al. | ................ 428/64.1 |
| 7,803,445 | B2 | * | 9/2010 | Hosoda | ..................... 428/64.1 |
| 2005/0254410 | A1 | * | 11/2005 | Kibe et al. | ............... 369/275.1 |
| 2007/0274185 | A1 | * | 11/2007 | Kikukawa et al. | .......... 369/59.1 |
| 2009/0029091 | A1 | * | 1/2009 | Deguchi et al. | ............ 428/64.6 |
| 2010/0103807 | A1 | * | 4/2010 | Tajima et al. | ............ 369/275.4 |

FOREIGN PATENT DOCUMENTS

JP   2006-294169   10/2006

* cited by examiner

*Primary Examiner*—Ali Neyzari
(74) *Attorney, Agent, or Firm*—Renner, Kenner, Greive, Bobak, Taylor & Weber

(57) ABSTRACT

An optical storage medium has a substrate and a cover layer that allows light to pass therethrough in recording or reproduction. Provided between the substrate and the cover layer are at least a reflective film, a first dielectric film, a recording film, and a second dielectric film formed in this order from the substrate side. Provided further between the second dielectric film and the cover layer is a damp-proof film that is at least partially an amorphous film and contains at least an indium oxide.

9 Claims, 3 Drawing Sheets

| | MATERIAL OF DAMP-PROOF FILM 7 | MODE OF FILM | AVERAGE SER |
|---|---|---|---|
| EMBODIMENT SAMPLE 1 | ITO ($In_2O_3+SnO_2$) | AMORPHOUS | $5.0 \times 10^{-5}$ |
| EMBODIMENT SAMPLE 2 | IWO ($In_2O_3+W_2O_5$) | AMORPHOUS | $9.1 \times 10^{-5}$ |
| EMBODIMENT SAMPLE 3 | ICO ($In_2O_3+CeO_2$) | AMORPHOUS | $6.8 \times 10^{-5}$ |
| COMPARATIVE SAMPLE 1 | – | – | $3.2 \times 10^{-3}$ |
| COMPARATIVE SAMPLE 2 | $In_2O_3$ | CRYSTALLINE | $2.1 \times 10^{-3}$ |
| COMPARATIVE SAMPLE 3 | $Si_3N_4$ | AMORPHOUS | MEASUREMENT FAILED |
| COMPARATIVE SAMPLE 4 | $Si_3N_4+SiO_2$ | AMORPHOUS | $1.8 \times 10^{-2}$ |
| COMPARATIVE SAMPLE 5 | $Al_2O_3$ | AMORPHOUS | MEASUREMENT FAILED |
| COMPARATIVE SAMPLE 6 | SiC | AMORPHOUS | $1.6 \times 10^{-3}$ |

TABLE 1

FIG. 2

| | MOLAR RATIO OF $SnO_2$ IN ITO [mol%] | MODE OF FILM | AVERAGE SER |
|---|---|---|---|
| EMBODIMENT SAMPLE 1 | 40 | AMORPHOUS | $5.0 \times 10^{-5}$ |
| EMBODIMENT SAMPLE 4 | 20 | AMORPHOUS | $7.2 \times 10^{-5}$ |
| EMBODIMENT SAMPLE 5 | 30 | AMORPHOUS | $6.9 \times 10^{-5}$ |
| EMBODIMENT SAMPLE 6 | 60 | AMORPHOUS | $5.3 \times 10^{-5}$ |
| EMBODIMENT SAMPLE 7 | 70 | AMORPHOUS | $1.8 \times 10^{-4}$ |
| COMPARATIVE SAMPLE 2 | 0 | CRYSTALLINE | $2.1 \times 10^{-3}$ |
| COMPARATIVE SAMPLE 7 | 5 | CRYSTALLINE | $1.1 \times 10^{-3}$ |
| COMPARATIVE SAMPLE 8 | 10 | CRYSTALLINE | $7.8 \times 10^{-4}$ |
| COMPARATIVE SAMPLE 9 | 80 | AMORPHOUS | $9.5 \times 10^{-4}$ |

TABLE 2

FIG. 3

| | LOCATION OF DAMP-PROOF FILM 7 BETWEEN | MODE OF FILM | AVERAGE SER |
|---|---|---|---|
| EMBODIMENT SAMPLE 1 | 2ND DIELECTRIC FILM 6 AND PROTECTIVE FILM 8 | AMORPHOUS | $5.0 \times 10^{-5}$ |
| COMPARATIVE SAMPLE 10 | RECORDING FILM 5 AND 2ND DIELECTRIC FILM 6 | AMORPHOUS | MEASUREMENT FAILED |
| COMPARATIVE SAMPLE 11 | INTERFACE FILM 3 AND 1ST DIELECTRIC FILM 4 | AMORPHOUS | $2.3 \times 10^{-3}$ |
| COMPARATIVE SAMPLE 12 | REFLECTIVE FILM 2 AND INTERFACE FILM 3 | AMORPHOUS | $2.5 \times 10^{-3}$ |

TABLE 3

FIG. 4

OPTICAL STORAGE MEDIUM AND METHOD OF PRODUCING OPTICAL STORAGE MEDIUM

CROSS-REFERENCE TO RELATED APPLICATIONS

This application is based on and claims the benefit of priority from the prior Japanese Patent Application No. 2007-124430 filed on May 9, 2007 and No. 2007-312208 filed on Dec. 3, 2007, the entire contents of which is incorporated herein by reference.

BACKGROUND OF THE INVENTION

The present invention relates to an optical storage medium for which a light beam, such as a laser beam, is used in data recording or reproduction and a method of producing such an optical storage medium. This invention, particularly, relates to a write-once type optical storage medium having a recording layer provided in the vicinity of the surface of either side of the medium and a method of producing such an optical storage medium.

DVD has been the mainstream of optical storage media for data recording or reproduction with a laser beam. Another type of optical storage medium becoming popular is Blu-ray Disc (referred to as BD hereinafter) having a larger storage capacity than DVD.

DVD and BD have the same disc shape with 12 cm in diameter and 1.2 mm in thickness. The differences between DVD and BD are as follows: DVD has a recording layer located at almost the middle of the thickness, or 0.6 mm away from both disc surfaces. Recording/reproduction is performed to the DVD recording layer with a laser beam at a red wavelength of 650 nm. BD has a recording layer located at 0.1 mm from either of the disc surfaces. Recording/reproduction is performed to the BD recording layer with a laser beam at a blue-violet wavelength of 405 nm.

Higher recording density is achieved for BD with a shorter wavelength for a laser beam and a larger number of numerical aperture (NA) for an objective lens than DVD.

A typical BD has at least a reflective film, a first dielectric film, a recording film, a second dielectric film, and a cover layer formed in order on a resin substrate of 1.1 mm in thickness. The total thickness is 0.1 mm except for the substrate.

The inventors of the present invention have found that BDs now on the market suffer deterioration of reproduced signals when left in a hot and humid environment for certain hours.

The test in which optical storage media are left in a hot and humid environment is one of the measures to evaluate the long-term reliability of the optical storage media in a short time. In this test, optical storage media are usually left in an 80° C. and 85% RH environment for 96 hours, which corresponds to a normal environment of 25° C. and 30% RH for several ten to several hundred years. The long-term reliability can be evaluated with measurements of average SER (Symbol Error Rate); the higher the average SER, the more the reproduced signals being deteriorated.

It is presupposed that the cause of deterioration of reproduced signals is the moisture in the air that reaches either or both of the recording and reflective films and generates a chemical reaction to the films or between the films and neighboring films. Deterioration of the recording and/or reflective films gives adverse effects to data recording to the recording film.

One solution to solve the problem caused by the moisture in the air that penetrates into an optical storage medium is disclosed, for example, in Japanese Un-examined Patent Publication No. 2006-294169 (referred to as document 1, hereinafter). The solution is to provide an intermediate layer for adjusting moisture permeability between a recording film made of an organic material and a cover layer. The intermediate layer contains an oxide or a nitride including at least one of the three elements: Nb (niobium), Al (aluminum) and Si (silicon), or a sulfide including Zn (zinc).

The experiments done by the inventors of the present invention for the evaluation of the long-term reliability to sample optical storage media having an inorganic recording film with an intermediate layer made of $Nb_2O_5$ showed a higher average SER after the sample media were left in a hot and humid environment.

Evaluated in the document 1 are jitters in reproduction before and after the optical storage media were left in a hot and humid environment. Suppression of jitters only is not enough to meet the demand for longer-term reliability for optical storage media, particularly, those having a recording film made of an inorganic material.

SUMMARY OF THE INVENTION

A purpose of the present invention is to provide an optical storage medium excellent in long-term reliability, protected from moisture in the air to reach recording and/or reflective films and a method of producing such an optical storage medium.

The present invention provides an optical storage medium comprising: a substrate; a cover layer that allows light to pass therethrough in recording or reproduction; at least a reflective film, a first dielectric film, a recording film, and a second dielectric film formed in this order from the substrate side and between the substrate and the cover layer; and a damp-proof film provided between the second dielectric film and the cover layer, the damp-proof film being at least partially an amorphous film and containing at least an indium oxide.

Moreover, the present invention provides a method of producing an optical storage medium comprising the steps of: forming at least a reflective film, a first dielectric film, a recording film, and a second dielectric film in this order on a substrate by sputtering; and forming a damp-proof film on the second dielectric film by sputtering with a target of an indium oxide added with at least one compound selected from the group consisting of a tin oxide, a tungsten oxide, and a cerium oxide; and providing a cover layer over the damp-proof film.

BRIEF DESCRIPTION OF DRAWINGS

FIG. 2 shows TABLE 1 listing measured average SER for embodiment medium samples E-1 to E-3 and comparative medium samples C-1 to C-6, depending on the material of a damp-proof film;

FIG. 3 shows TABLE 2 listing measured average SER for the embodiment sample E-1, embodiment samples E-4 to E-7, the comparative sample C-2, and comparative samples C-7 to C-9, depending the molar ratio of $SnO_2$ in ITO; and FIG. 4 shows TABLE 3 listing measured average SER for the embodiment sample E-1 and comparative samples C-10 to C-12, depending on the location of the damp-proof film in the sample media.

DETAILED DESCRIPTION OF PREFERRED EMBODIMENT

[Structure of Optical Storage Medium]

Figure 1:
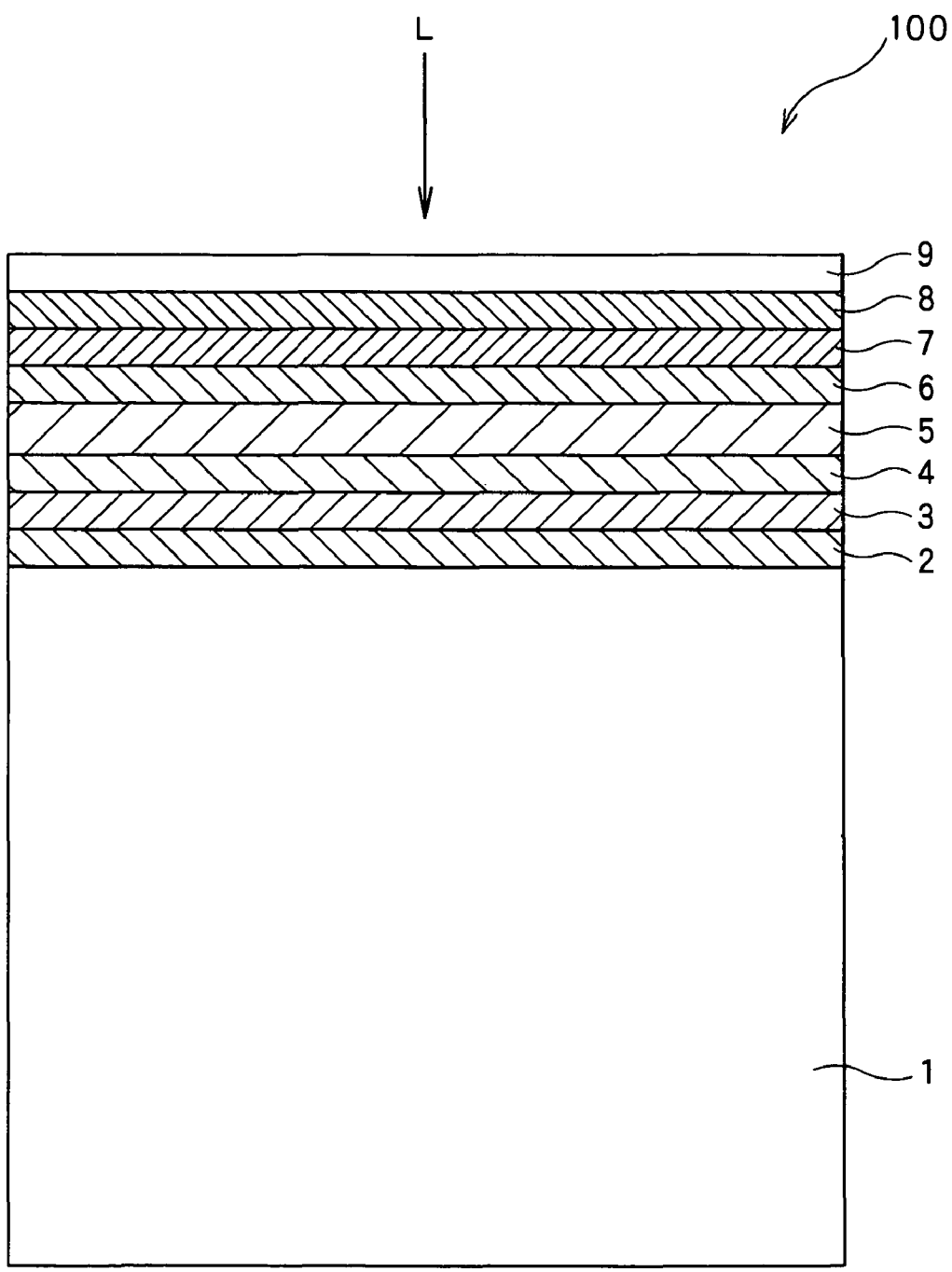
FIG. 1 shows an enlarged cross section illustrating an optical storage medium, a preferred embodiment of the present invention.

An optical storage medium 100 shown in FIG. 1 has a reflective film 2, an interface film 3, a first dielectric film 4, a recording film 5, a second dielectric film 6, a damp-proof film 7, a protective film 8, and a cover film 9 formed in order on a substrate 1 of 1.1 mm in thickness. The interface film 3 is an option, as discussed later. The total thickness of these films is 0.1 mm. The optical storage medium 100 is irradiated with a laser beam L via the cover film 9 in recording or reproduction.

The substrate 1 needs to not allow the laser beam L to pass therethrough, different from DVD. Thus, the material for the substrate 1 can be selected under consideration of physical strength and production cost, etc. Such materials are, for example, glass, polycarbonate, polymethylmethacrylate, polyolefin resin, epoxy resin, or polyimide resin. The most suitable material for the substrate 1 is polycarbonate for low hygroscopicity and easiness to process.

Preferable materials for the reflective film 2 are: a reflective metal, such as Al, Au (gold) or Ag (silver); an alloy of any of these metals as a major component with at least one type of metal or semiconductor; and a mixture of a metal, such as Al, Au or Ag, and a metal nitride, a metal oxide or a metal chalcogen of Al, Si, etc. A typical alloy preferable for the reflective film 2 is made of Al and at least one of the following elements: Si, Mg (magnesium), Cu (copper), Pd (palladium), Ti (titanium), Cr (chrome), Hf (hafnium), Ta (tantalum), Nb, Mn (manganese), Zr (zirconium), etc. Another typical alloy preferable for the reflective film 2 is made of Au or Ag and at least one of the following elements: Cr, Ag, Cu, Pd, Pt (platinum), Ni (nickel), Nd (neodymium), In (indium), etc. Most preferable among them are Ag and an alloy of Ag as a major component for higher reflectivity to blue-violet wavelength and higher thermal conductivity for higher signal levels.

The thickness of the reflective film 2 is, preferably, in the range from 50 nm to 300 nm, which depends on the thermal conductivity of a material used for this film. The reflective film 2 of 50 nm or more in thickness is optically stable in, particularly, reflectivity. Nevertheless, a thicker reflective film 2 affects a cooling rate. Thickness over 300 nm requires a longer production time. It is desirable to use a specific material exhibiting a high thermal conductivity that allows the reflective film 2 to have a thickness in an optimum range such as mentioned above.

The interface film 3 is preferably provided between the reflective film 2 and the first dielectric film 4 as shown in FIG. 1 when the film 2 includes Ag or an alloy of Ag and the film 4 includes ZnS (zinc sulfide) or a mixture of ZnS. The interface film 3 suppresses defects due to generation of a compound of AgS caused by a chemical reaction between S (sulfur) in the first dielectric film 4 and Ag in the reflective film 2. Thus, one requirement for the interface film 3 is that it is made of a material without including a sulfide. An acceptable material for the interface film 3 includes at least any one of a nitride, an oxide and a carbide, specifically, germanium nitride, silicon nitride, aluminum oxide, zirconium oxide, chromium oxide, and carbon. Oxygen, nitrogen or hydrogen may be added to the material of the interface film. The nitride, oxide and carbide listed above may not be stoichiometric compositions for such an interface film. In other words, nitrogen, oxygen or carbon may be excessive or insufficient.

The first and second dielectric films 4 and 6 are provided to protect the substrate 1, the protective film 8 or the other films from deformation due to heat generated in data recording to the recording film 5, so as not to lower the recording characteristics, and to enhance signal contrast with optical interference. The first and second dielectric films 4 and 6 allow a laser beam L to pass therethrough in recording, reproduction or erasure and exhibits a refractive index "n", preferably, in the range of $1.9 \leq n \leq 2.5$. A suitable material for the first and second dielectric films 4 and 6 is a material that exhibits high thermal tolerance, for example, an oxide such as $SiO_2$, SiO, ZnO, $TiO_2$, $Ta_2O_5$, $Nb_2O_5$, $ZrO_2$ or MgO, a sulfide such as ZnS, $In_2S_3$ or $TaS_4$, or a carbide such as SiC, TaC, WC (tungsten carbide) or TiC, or a mixture of these materials. Among them, a mixture of ZnS and $SiO_2$ is the best for higher recording sensitivity, C/N and film-forming rate, and also higher productivity. The first and second dielectric films 4 and 6 may or may not be made of the same material or composition. Their thicknesses are roughly in the range from 10 nm to 200 nm.

The recording film 5 provided between the first and second dielectric films 4 and 6 is made of an inorganic material. The recording film 5 has a dual-layer structure of two elements of a metal and a semiconductor or a single-layer structure of a metal oxide or nitride. The recording film 5 of the dual-layer structure undergoes data recording with fusion of the dual-layer elements due to heat generated when irradiated with the laser beam L. The recording film 5 of the single-layer structure undergoes data recording with liberation of oxygen or nitrogen from the metal oxide or nitride due to heat generated when irradiated with the laser beam L. The metal nitride is the most feasible among the materials for the recording film 5, for excellent jitter and recording-power margin characteristics.

When formed with a metal nitride, the recording film 5 requires to liberate nitrogen at about 600° C. (the recording temperature) or lower for data recording. Thus, the recording film 5 is, preferably, formed with a material that includes, at least, a material of low melting point for which phase separation occurs at about 600° C. or lower. Such materials of low melting point are, for example, BiN (bismuth nitride), $Fe_2N$ (iron nitride), $Cu_3N$ (copper nitride), etc.

In addition to the material of low melting point, the recording film 5 is, preferably, formed with a material of high melting point for which phase separation does not occur at about 600° C. or lower. Such materials of high melting point are, for example, nitrides and oxides that exhibit a high melting point, which are, for example, GeN, TiN, NbN, ZrN, WO, $ZrO_2$, $TiO_2$, $Nb_2O_5$, $Ta_2O_5$, etc. When BiN and GeN are selected as the materials of low and high melting points, respectively, GeN and BiN are adjusted to exhibit a molar ratio in the range from 2:8 to 8:2.

When the recording film 5 of such a composition of BiN and GeN is irradiated with a laser beam L in recording, the temperature of the laser-irradiated section rises to allow nitrogen to liberate from BiN, leaving the metal of bismuth only, which results in change in optical characteristics of the recording film 5 to accept data recording or retrieving (reproduction). The liberation of nitrogen from BiN is an irreversible change so that the once-liberated nitrogen cannot combine with bismuth. Therefore, the optical storage medium 100 shown in FIG. 1 and having the structure described above functions as a write-once type optical storage medium which does not allow rewriting of stored data. The recording film 5 has a thickness in the range from 10 nm to 40 nm. The thickness thinner than 10 nm has a difficulty in achieving enough difference in refractivity between recording and un-recording whereas thicker than 40 nm causes lower recording sensibility.

As shown in FIG. 1, the damp-proof film 7 is provided on the second dielectric film 6. The damp-proof film 7 requires to allow the laser beam L to pass therethrough and prevent or restrict moisture in the air from penetration into the optical storage medium 100. Any material is available for the damp-proof film 7, as long as it meets the above requirements. Preferable materials are, however, those including at least one of the three compounds: a nitride, an oxide, and a carbide. The most feasible one is an amorphous film including an indium oxide. The material used for the damp-proof film 7 in this embodiment is an $SnO_2$-rich ITO (Indium Tin Oxide). ITO is a compound of an indium oxide ($In_2O_3$) added with a tin oxide ($SnO_2$). A higher percentage of $SnO_2$ changes the film of ITO into the amorphous phase.

The amorphous ITO film, or $SnO_2$-rich ITO film, lowers moisture permeability for the damp-proof film 7. If crystalline, the damp-proof film 7 inevitably has the grain boundary which allows moisture to pass therethrough. However, the amorphous damp-proof film 7 does not have the grain boundary so that moisture is prevented or restricted from moving, compared to the crystalline film. The most feasible state for the damp-proof film 7 is that it is completely amorphous. It is, however, preferable that the film 7 is at least partially amorphous. Moreover, it is preferable that the film 7 is amorphous for its 50% or higher in volume. The damp-proof film 7 has a thickness in the range from 5 nm to 100 nm. The thickness thinner than 5 nm cannot restrict moisture from moving whereas thicker than 60 nm lowers productivity. A preferable range for the thickness of the damp-proof film 7 is in the range from 5 nm to 60 nm.

Provided on the damp-proof film 7 is the protective film 8 made of a UV (UltraViolet)-curable resin with a thickness of about several μm. The protective film 8 is covered with the cover layer 9. The cover layer 9 is, for example, a polycarbonate sheet (PC sheet) applied with an adhesive material on its surface at the protective film 8 side and a coating agent on the other surface at the medium 100 surface side. The thickness of the cover layer 9 is about 0.1 mm for the very thin films 2 to 8.

[Optical Storage Medium Production Method]

Lamination of the reflective film 2, the interface film 3, the first dielectric film 4, the recording film 5, the second dielectric film 6, and the damp-proof film 7 on the substrate 1, shown in FIG. 1, is achieved by any known vacuum thin-film forming technique, such as, vacuum deposition (with resistive heating or electron bombardment), ion plating, (D.C., A.C. or reactive) sputtering. The most feasible among the techniques is sputtering for easiness of composition and film-thickness control.

A film-forming system feasible for forming the films 2 to 7 on the substrate 1 is a batch system in which a plural number of substrates are simultaneously subjected to a film forming process in a vacuum chamber or a single-wafer system in which substrates are processed one by one. The thickness of each film can be adjusted with control of power to be supplied and its duration in sputtering or monitoring conditions of deposited films with a crystal oscillator.

The films 2 to 7 can be formed while each substrate is being stationary, transferred or rotating. Rotation of the substrate (and further with orbital motion) is most feasible for higher uniformity. An optional cooling process decreases warpage of the substrate.

After formation of these films on the substrate 1, a UV-curable resin is applied on the damp-proof film 7 and cured to become the protective film 8. Then, the cover layer 9 made of a PC sheet and applied with an adhesive material is provided on the protective film 8, to obtain the optical storage medium 100 shown in FIG. 1.

Instead of providing the protective film 8 on the damp-proof film 7, a highly-viscous UV-curable resin can be applied on the film 7 at about 0.1 mm in thickness, to be the cover layer 9. For higher productivity, forming the cover layer 9 of the highly-viscous UV-curable resin without the protective film 8 is better than the cover layer 9 of the PC sheet on the protective film 8. On the contrary, forming the cover layer 9 of the PC sheet on the protective film 8 is preferable for higher in-plane thickness uniformity.

Another option is that after a UV-curable resin is applied on the damp-proof film 7 as the protective film 8, a PC sheet is placed on the un-cured protective film 8 as the cover layer 9, and the un-cured protective film 8 is exposed to UV rays via the cover layer 9, to be cured so that the cover layer 9 is fixed on the protective film 8. A further option is that a thermally-curable hardcoat layer is provided on the PC sheet or a highly-viscous UV-curable resin. One requirement for the further option is that the total thickness of the films be 0.1 mm, except for the substrate 1.

Although not shown in FIG. 1, the substrate 1 has convexes and concaves (lands and grooves) formed thereon, for use in tracking a laser beam L in recording or reproduction. The convexes and concaves of the substrate 1 are inevitably transferred and formed on the damp-proof film 7 when a film-forming technique of a high degree of straightness, such as sputtering, is employed to form the reflective film 2, the interface film 3, the first dielectric film 4, the recording film 5, the second dielectric film 6, and the damp-proof film 7 on the substrate 1.

Forming the cover layer 9 on the damp-proof film 7 with the convexes and concaves allows air to remain in the concaves, which impairs the long-term reliability of the optical storage medium 100. The convexes and concaves of the damp-proof film 7 can be erased by forming the protective layer 8 on the damp-proof film 7 with spin coating. The spin-coating technique removes the air from the concaves to solve one of the problems on the long-term reliability. It is thus preferable to form the protective layer 8 on the damp-proof film 7 with spin coating. Spin coating is also preferable when the cover layer 9 is formed by applying a highly-viscous UV-curable resin on the damp-proof film 7, at a thickness of about 0.1 mm.

[Study of Material for Damp-Proof Film]

The inventors of the present invention presupposed that the damp-proof film 7 made of an amorphous film including an indium oxide and provided between the second dielectric film 6 and the protective film 8 could give high long-term reliability to the optical storage medium 100, and found out that the presumption is correct according to the following measurements for embodiment samples E-1 to E-3 and comparative samples C-1 to C-6.

In the following embodiment and comparative media samples, the average SER was measured after each sample was left in an 80° C.-85% RH environment for 96 hours, with an optical-disc drive tester (ODU-1000) equipped with a 405-nm-wavelength laser diode and an optical lens (NA=0.85) made by Pulstec Industrial Co. Ltd.

Embodiment Sample E-1

Several films which will be disclosed later, were formed on a substrate 1 made of a polycarbonate resin with 120 mm in diameter and 1.1 mm in thickness. Grooves were formed on the substrate 1 at 0.32 μm in track pitch, with 25 nm in groove depth and about 50:50 in width ratio of groove to land.

After a vacuum chamber was exhausted up to $3 \times 10^{-4}$ Pa, an 80-nm-thick reflective film 2 was formed on the substrate 1 by magnetron sputtering with a target of an alloy of Ag—Pd—Cu at $2 \times 10^{-1}$ Pa in an Ar-gas atmosphere.

Formed on the reflective film 2, in order, were: a 2-nm-thick GeCrN interface film 3 with a target of an alloy of GeCr in an Ar—$N_2$ gas-mixture atmosphere; a 20-nm-thick first dielectric film 4 with a target of ZnS added with 20-mol % $SiO_2$; a 25-nm-thick GeBiN recording film 5 with a target of an alloy of GeBi (with an elemental ratio of 50:50) in an Ar—$N_2$ gas-mixture atmosphere; a 50-nm-thick second dielectric film 6 of the same material as the first dielectric film 4; and a 20-nm-thick damp-proof film 7 with a target of $In_2O_3$ added with 40-mol % $SnO_2$.

The substrate 1 having the films 2 to 7 formed as described above was then taken out from the vacuum chamber.

The damp-proof film 7 was spin-coated with an acrylic UV-curable resin (SK5110 made by Sonny Chemicals & Information Device Corporation), to have a protective film 8 which was then applied with a PC sheet as a cover layer 9 via an adhesive material, thus the embodiment sample E-1 of the optical storage medium 100 (FIG. 1) was produced. The thickness of the PC sheet with the adhesive material was about 0.1 mm.

Concerning the damp-proof film 7, a sample 100-nm-thick $In_2O_3$ film was formed on a silicon wafer, by sputtering, with a target of $In_2O_3$ added with 40-mol % $SnO_2$. An X-ray diffraction technique confirmed that this sample $In_2O_3$ film was an amorphous film. This proves that the damp-proof film 7 of the optical storage medium 100 is an amorphous film.

Data were recorded on the embodiment sample E-1 of the optical storage medium 100, with the optical-disc drive tester made by Pulstec Industrial Co. Ltd., described above. The embodiment sample E-1 was then left in an 80° C.-85% RH environment for 96 hours, for measurements of the average SER on the data-recorded tracks.

The measured result for the embodiment sample E-1 is shown in TABLE 1 of FIG. 2, together with those for the embodiment samples E-2 and E-3 and the comparative samples C-1 to C-6. In TABLE 1 and also TABLE 2 and 3 which will be discussed later, MODE OF FILM indicates whether the damp-proof film 7 in each sample is an amorphous or a crystalline film.

As shown in TABLE 1, the embodiment sample E-1 exhibited $5.0 \times 10^{-5}$ in the average SER. In the evaluation of the measurements, the maximum acceptable level is set at $2.0 \times 10^{-4}$ that is an average SER known as indicating high data reliability. The average SER of $5.0 \times 10^{-5}$ is lower than the maximum acceptable level. Thus, the embodiment sample E-1 is excellent in the average SER.

Embodiment Sample E-2

The embodiment sample E-2 of the optical storage medium 100 was identical to the embodiment sample E-1, except for the damp-proof film 7 formed, by sputtering, with a target of $In_2O_3$ with $W_2O_5$ added at 20 mol %. Like the sample E-1, it was also confirmed that the $In_2O_3$-sputtering film with $W_2O_5$ added at 20 mol % was an amorphous film.

As shown in TABLE 1, the embodiment sample E-2 exhibited $9.1 \times 10^{-5}$ in the average SER, lower than the maximum acceptable level of $2.0 \times 10^{-4}$, which is excellent. In TABLE 1, IWO is the abbreviation for indium-tungsten oxide.

Embodiment Sample E-3

The embodiment sample E-3 of the optical storage medium 100 was identical to the embodiment sample E-1, except for the damp-proof film 7 formed, by sputtering, with a target of $In_2O_3$ with $CeO_2$ (cerium oxide) added at 20 mol %. Like the sample E-1, it was also confirmed that the $In_2O_3$-sputtering film with $CeO_2$ added at 20 mol % was an amorphous film.

As shown in TABLE 1, the embodiment sample E-3 exhibited $6.8 \times 10^{-5}$ in the average SER, lower than the maximum acceptable level of $2.0 \times 10^{-4}$, which is excellent. In TABLE 1, ICO is the abbreviation for indium-cerium oxide.

In the embodiment samples E-1, E-2 and E-3, the damp-proof films 7 were formed, by sputtering, with the targets of $In_2O_3$ with a tin oxide, a tungsten oxide, and a cerium oxide, respectively, as described above. However, the damp-proof film 7 of each sample can be formed with the target of $In_2O_3$ with a mixture of any of two or three of the following compounds: a tin oxide, a tungsten oxide, and a cerium oxide.

(Comparative Sample C-1)

The comparative sample C-1 of the optical storage medium 100 was identical to the embodiment sample E-1, except that the damp-proof film 7 was not formed.

As shown in TABLE 1, the comparative sample C-1 exhibited $3.2 \times 10^{-3}$ in the average SER, higher than the maximum acceptable level of $2.0 \times 10^{-4}$, which is not acceptable.

(Comparative Sample C-2)

The comparative sample C-2 of the optical storage medium 100 was identical to the embodiment sample E-1, except for the damp-proof film 7 formed with a target of $In_2O_3$ with no other compound added. It was confirmed that the $In_2O_3$-sputtering film with no other compound added was a crystalline film.

As shown in TABLE 1, the comparative sample C-2 exhibited $2.1 \times 10^{-3}$ in the average SER, higher than the maximum acceptable level of $2.0 \times 10^{-4}$, which is not acceptable.

(Comparative Sample C-3)

The comparative sample C-3 of the optical storage medium 100 was identical to the embodiment sample E-1, except for the damp-proof film 7 formed with a target of $Si_3N_4$ with no other compound added. It was confirmed that the $Si_3N_4$-sputtering film with no other compound added was an amorphous film.

The measurements of the average SER failed due to creation of many defects after the comparative sample C-3 was left in an 80° C.-85% RH environment for 96 hours.

(Comparative Sample C-4)

The comparative sample C-4 of the optical storage medium 100 was identical to the embodiment sample E-1, except for the damp-proof film 7 formed with a target of $Si_3N_4$ with $SiO_2$ added at 50 mol %. It was confirmed that the $Si_3N_4$-sputtering film with $SiO_2$ added at 50 mol % was an amorphous film.

As shown in TABLE 1, the comparative sample C-4 exhibited $1.8 \times 10^{-2}$ in the average SER, higher than the maximum acceptable level of $2.0 \times 10^{-4}$, which is not acceptable.

(Comparative Sample C-5)

The comparative sample C-5 of the optical storage medium 100 was identical to the embodiment sample E-1, except for the damp-proof film 7 formed with a target of $Al_2O_3$ with no other compound added. It was confirmed that the $Al_2O_3$-sputtering film with no other compound added was an amorphous film.

The measurements of the average SER failed for the comparative sample C-5 due to creation of many defects, like the comparative sample C-3.

(Comparative Sample C-6)

The comparative sample C-6 of the optical storage medium 100 was identical to the embodiment sample E-1, except for the damp-proof film 7 formed with a target of SiC with no other compound added. It was confirmed that the SiC-sputtering film with no other compound added was an amorphous film.

As shown in TABLE 1, the comparative sample C-6 exhibited $1.6 \times 10^{-3}$ in the average SER, higher than the maximum acceptable level of $2.0 \times 10^{-4}$, which is not acceptable.

It is taught from the results shown in TABLE 1 that the recording film 5 or the neighboring films suffers corrosion when moisture penetrates into the optical storage medium 100 via the cover layer 9 when no damp-proof film is provided, like the comparative sample C-1. The result of measurements was very bad for the comparative sample C-1, which was $3.2 \times 10^{-3}$ in the average SER.

The results teach that the damp-proof film 7 is an essential component of the optical storage medium 100 for the long-term reliability.

There are particular materials for the damp-proof film 7 to maintain an acceptable average SER, according to TABLE 1 of FIG. 2, that are materials including an indium oxide. Another requirement of the damp-proof film 7 is that it is an amorphous film.

The results shown in TABLE 1 of FIG. 2 confirm that the optical storage medium 100 requires the damp-proof film 7, that is an amorphous film and including an indium oxide, provided between the second dielectric film 6 and the protective film 8, for higher long-term reliability. And, the measurements of average SER confirmed that the optical storage medium 100 exhibits higher long-term reliability than known optical storage media.

[Study of Molar Ratio of $SnO_2$ in ITO]

The inventors of the present invention examined the molar ratio of $SnO_2$ in ITO necessary for the damp-proof film 7 to become an amorphous film, according to the embodiments sample E-1, the comparative sample C-2, and the following embodiments sample E-4 to E-7 and comparative samples C-7 to C-9.

Embodiment Sample E-4

The embodiment sample E-4 of the optical storage medium 100 was identical to the embodiment sample E-1, except for the damp-proof film 7 formed, by sputtering, with a target of $In_2O_3$ with $SnO_2$ added at 20 mol %. It was confirmed that the $In_2O_3$-sputtering film with $SnO_2$ added at 20 mol % was an amorphous film.

As shown in TABLE 2 of FIG. 3, the embodiment sample E-4 exhibited $7.2 \times 10^{-5}$ in the average SER, lower than the maximum acceptable level of $2.0 \times 10^{-4}$, which is excellent.

Also shown TABLE 2 are the measured results for the embodiment samples E-1 and E-5 to E-7 and the comparative samples C-2 and C-7 to C-9.

Embodiment Sample E-5

The embodiment sample E-5 of the optical storage medium 100 was identical to the embodiment sample E-1, except for the damp-proof film 7 formed, by sputtering, with a target of $In_2O_3$ with $SnO_2$ added at 30 mol %. It was confirmed that the $In_2O_3$-sputtering film with $SnO_2$ added at 30 mol % was an amorphous film.

As shown in TABLE 2, the embodiment sample E-5 exhibited $6.9 \times 10^{-5}$ in the average SER, lower than the maximum acceptable level of $2.0 \times 10^{-4}$, which is excellent.

Embodiment Sample E-6

The embodiment sample E-6 of the optical storage medium 100 was identical to the embodiment sample E-1, except for the damp-proof film 7 formed, by sputtering, with a target of $In_2O_3$ with $SnO_2$ added at 60 mol %. It was confirmed that the $In_2O_3$-sputtering film with $SnO_2$ added at 60 mol % was an amorphous film.

As shown in TABLE 2, the embodiment sample E-6 exhibited $5.3 \times 10^{-5}$ in the average SER, lower than the maximum acceptable level of $2.0 \times 10^{-4}$, which is excellent.

Embodiment Sample E-7

The embodiment sample E-7 of the optical storage medium 100 was identical to the embodiment sample E-1, except for the damp-proof film 7 formed, by sputtering, with a target of $In_2O_3$ with $SnO_2$ added at 70 mol %. It was confirmed that the $In_2O_3$ film with $SnO_2$ added at 70 mol % was an amorphous film.

As shown in TABLE 2, the embodiment sample E-7 exhibited $1.8 \times 10^{-4}$ in the average SER, lower than the maximum acceptable level of $2.0 \times 10^{-4}$, which is excellent.

(Comparative Sample C-7)

The comparative sample C-7 of the optical storage medium 100 was identical to the embodiment sample E-1, except for the damp-proof film 7 formed with a target of $In_2O_3$ with $SnO_2$ added at 5 mol %. It was confirmed that the $In_2O_3$-sputtering film with $SnO_2$ added at 5 mol % was not an amorphous film but a crystalline film.

As shown in TABLE 2, the comparative sample C-7 exhibited $1.1 \times 10^{-3}$ in the average SER, higher than the maximum acceptable level of $2.0 \times 10^{-4}$, which is not acceptable.

(Comparative Sample C-8)

The comparative sample C-8 of the optical storage medium 100 was identical to the embodiment sample E-1, except for the damp-proof film 7 formed with a target of $In_2O_3$ with $SnO_2$ added at 10 mol %. It was confirmed that the $In_2O_3$-sputtering film with $SnO_2$ added at 10 mol % was not an amorphous film but a crystalline film.

As shown in TABLE 2, the comparative sample C-8 exhibited $7.8 \times 10^{-4}$ in the average SER, higher than the maximum acceptable level of $2.0 \times 10^{-4}$, which is not acceptable.

(Comparative Sample C-9)

The comparative sample C-9 of the optical storage medium 100 was identical to the embodiment sample E-1, except for the damp-proof film 7 formed with a target of $In_2O_3$ with $SnO_2$ added at 80 mol %. It was confirmed that the $In_2O_3$-sputtering film with $SnO_2$ added at 80 mol % was an amorphous film.

As shown in TABLE 2, the comparative sample C-9 exhibited $9.5 \times 10^{-4}$ in the average SER, higher than the maximum acceptable level of $2.0 \times 10^{-4}$, which is not acceptable.

[Study of Film Arrangements]

The inventors of the present invention further examined the location of the damp-proof film 7 on the substrate 1. In FIG. 1, the damp-proof film 7 is provided between the second dielectric film 6 and the protective film 8. However, it might be provided between the recording film 5 and the second dielectric film 6. It might also be provided between the first dielectric film 4 and the interface film 3 or between the interface film 3 and the reflective film 2, under consideration of the effects of penetrated moisture to the reflective film 2.

Comparison was then made between the embodiment sample E-1 and the following comparative samples C-10 to C-12 of the optical storage medium 100 that were formed with a different order of films from the sample E-1.

(Comparative Sample C-10)

The comparative sample C-10 of the optical storage medium 100 was identical to the embodiment sample E-1, except that the damp-proof film 7 was provided between the recording film 5 and the second dielectric film 6, not between the second dielectric film 6 and the protective film 8 (FIG. 1).

As shown in TABLE 3 of FIG. 4, the measurements of average SER failed for the comparative sample C-10. A possible reason for the failed measurements is ion migration that occurred between Sn of the damp-proof film 7 and the recording film 5 made of GeBiN, causing erosion.

Also shown TABLE 3 are the measured results for the embodiment sample E-1 and the comparative samples C-11 and C-12.

(Comparative Sample C-11)

The comparative sample C-11 of the optical storage medium 100 was identical to the embodiment sample E-1, except that the damp-proof film 7 was provided between the interface film 3 and the first dielectric film 4.

As shown in TABLE 3, the comparative sample C-11 exhibited $2.3 \times 10^{-3}$ in the average SER, higher than the maximum acceptable level of $2.0 \times 10^{-4}$, which is not acceptable. A possible reason for the unacceptable average SER is the effects of penetrated moisture to the recording film 5 due to no protection of the recording film 5 by the damp-proof film 7.

(Comparative Sample C-12)

The comparative sample C-11 of the optical storage medium 100 was identical to the embodiment sample E-1, except that the damp-proof film 7 was provided between the reflective film 2 and the interface film 3.

As shown in TABLE 3, the comparative sample C-12 exhibited $2.5 \times 10^{-3}$ in the average SER, higher than the maximum acceptable level of $2.0 \times 10^{-4}$, which is not acceptable. A possible reason for the unacceptable average SER is the effects of penetrated moisture to the recording film 5 due to no protection of the recording film 5 by the damp-proof film 7, like the comparative sample C-11.

The measured results shown in TABLE 3 confirmed that the optical storage medium 100 requires the damp-proof film 7 to be provided between the second dielectric film 6 and the cover layer 9, for excellent long-term reliability. In particular, it requires that the damp-proof film 7 be provided between the second dielectric film 6 and the protective film 8, for the optical storage medium 100 having the cover layer 9 on the protective film 8, as shown in FIG. 1. Nevertheless, it can be said that the damp-proof film 7 requires to be provided between the second dielectric film 6 and the cover layer 9, not only for the medium 100 having the dual-layer protection structure of the protective film 8 and the cover layer 9, as shown in FIG. 1, but also for the medium 100 having the single-layer protection structure of the cover layer 9 of a highly-viscous UV-curable resin, as already described.

The present invention employs BD as the embodiment in which the recording film is provided in the vicinity of either of two medium surfaces. Not only BD, however, the invention can be applied to any types of optical storage media in which the recording film is provided in the vicinity of either of two medium surfaces, with a thin cover layer (or any equivalent surface layer).

As disclosed above in detail, the present invention provides the optical storage medium and the method therefor, with excellent long-term reliability by preventing or restricting moisture in the air from reaching the recording film, the reflective film, etc.

What is claimed is:

1. An optical storage medium comprising:
    a substrate;
    a cover layer that allows light to pass therethrough in recording or reproduction;
    at least a reflective film, a first dielectric film, a recording film, and a second dielectric film formed in this order from the substrate side and between the substrate and the cover layer; and
    a damp-proof film provided between the second dielectric film and the cover layer, the damp-proof film being at least partially an amorphous film and containing at least an indium oxide.

2. The optical storage medium according to claim 1, wherein the damp-proof film contains at least one compound selected from the group consisting of a tin oxide, a tungsten oxide, and a cerium oxide.

3. The optical storage medium according to claim 1, wherein the damp-proof film contains a tin oxide at 20 mol % or higher but lower than 80 mol %.

4. The optical storage medium according to claim 1, wherein the cover layer is made of a highly-viscous ultraviolet curable resin.

5. The optical storage medium according to claim 1 further comprising a protective film between the second dielectric film and the cover layer in which the damp-proof film is provided between the second dielectric film and the protective film.

6. A method of producing an optical storage medium comprising the steps of:
    forming at least a reflective film, a first dielectric film, a recording film, and a second dielectric film in this order on a substrate by sputtering; and
    forming a damp-proof film on the second dielectric film by sputtering with a target of an indium oxide added with at least one compound selected from the group consisting of a tin oxide, a tungsten oxide, and a cerium oxide; and
    providing a cover layer over the damp-proof film.

7. The method according to claim 6 further comprising the step of forming a protective film on the damp-proof film and between the damp-proof film and the cover layer by spin coating.

8. The method according to claim 6, wherein the step of providing the cover layer includes the step of forming a resin layer on the damp-proof film as the cover layer by spin coating.

9. The method according to claim 6 further comprising the steps of:
    forming a protective film of a ultraviolet curable resin on the damp-proof film, wherein the cover layer is provided on the protective film; and
    exposing the protective film to ultraviolet rays via the cover layer to cure the protective film, thus the cover layer is fixed on the protective film.

* * * * *